United States Patent [19]
Taylor et al.

[11] Patent Number: 5,533,771
[45] Date of Patent: Jul. 9, 1996

[54] MULTIPLE PURPOSE TRUCK TAILGATE APPARATUS

[76] Inventors: Shepard Taylor; Seabrook Taylor, both of Rte. 2, Box 1070, Gresham, S.C. 29546

[21] Appl. No.: 368,851

[22] Filed: Jan. 5, 1995

[51] Int. Cl.⁶ .................................................. B62D 33/02
[52] U.S. Cl. ..................... 296/26; 296/57.1; 296/61; 182/64; 108/44; 414/522; 414/537
[58] Field of Search .............................. 296/26, 57.1, 61, 296/62; 280/638, 35, 639, 78; 224/402, 403, 405, 553, 554; 182/64, 127; 108/44; 414/522, 537

[56] References Cited

U.S. PATENT DOCUMENTS

| | | | |
|---|---|---|---|
| 1,699,882 | 1/1929 | Ferguson | 296/61 X |
| 1,756,629 | 4/1930 | Campbell | 224/405 X |
| 3,877,714 | 4/1975 | Black | 280/638 |
| 3,977,545 | 8/1976 | Lloyd | 414/537 |
| 4,408,680 | 10/1983 | Ross | 182/127 |
| 4,696,374 | 9/1987 | Hale | 182/127 |
| 4,990,049 | 2/1991 | Hargrove | 414/537 |
| 5,156,432 | 10/1992 | McCleary | 296/61 |
| 5,205,603 | 4/1993 | Burdette, Jr. | 296/62 |
| 5,244,335 | 9/1993 | Johns | 296/61 X |

FOREIGN PATENT DOCUMENTS

| | | | |
|---|---|---|---|
| 1521665 | 3/1968 | France | 296/26 |
| 681534 | 4/1993 | Switzerland | 414/537 |

*Primary Examiner*—Dennis H. Pedder
*Attorney, Agent, or Firm*—Richard L. Miller

[57] ABSTRACT

A multiple purpose truck tailgate apparatus for a pickup truck of the type having a bed and a tailgate pivotally mounted to the bed. The apparatus comprises a first panel member. A structure for mounting the first panel member in a sliding manner to the bed of the truck. When the tailgate is opened, the first panel member can be extended therefrom. A second panel member is provided. A facility is for coupling the second panel member against a free end of the first panel member. A third panel member is provided. A facility is for coupling the third panel member against a free end of the second panel member. An assembly is for pivoting the first panel member on the sliding mounting structure. The first panel member with the second panel member and the third panel member can be positioned at various angles at the opened tailgate, to be used for different tasks.

5 Claims, 2 Drawing Sheets

MULTIPLE PURPOSE TRUCK TAILGATE APPARATUS

BACKGROUND OF THE INVENTION

The instant invention relates generally to vehicle attachment equipment and more specifically it relates to a multiple purpose truck tailgate apparatus.

Numerous vehicle attachment equipment have been provided in prior art that are adapted to include hunting stands, bed liners, loading ramps and ladder assemblies that can be attached to the rear decks, the beds and the tailgates of the vehicles. For example, U.S. Pat. Nos. 4,696,374 to Hale; 4,990,049 to Hargrove; 5,156,432 to McCleary and 5,205,603 to Burdette, Jr. all are illustrative of such prior art. While these units may be suitable for the particular purpose to which they address, they would not be as suitable for the purposes of the present invention as heretofore described.

SUMMARY OF THE INVENTION

A primary object of the present invention is to provide a multiple purpose truck tailgate apparatus that will overcome the shortcomings of the prior art devices.

Another object is to provide a multiple purpose truck tailgate apparatus that is mounted in a stored and sliding manner to a truck bed, so that when the tailgate is opened the apparatus can be extended therefrom and be placed in various adjusted locked positions, so as to be suitable for different tasks.

An additional object is to provide a multiple purpose truck tailgate apparatus that can be used as a loading ramp, a display/work table, an incline ramp, a ladder and a two position hunters perch.

A further object is to provide a multiple purpose truck tailgate apparatus that is simple and easy to use.

A still further object is to provide a multiple purpose truck tailgate apparatus that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

The Figures on the drawings are briefly described as follows.

DETAILED DESCRIPTION OF THE PREFERRED EMBODIMENTS

Figure 1:
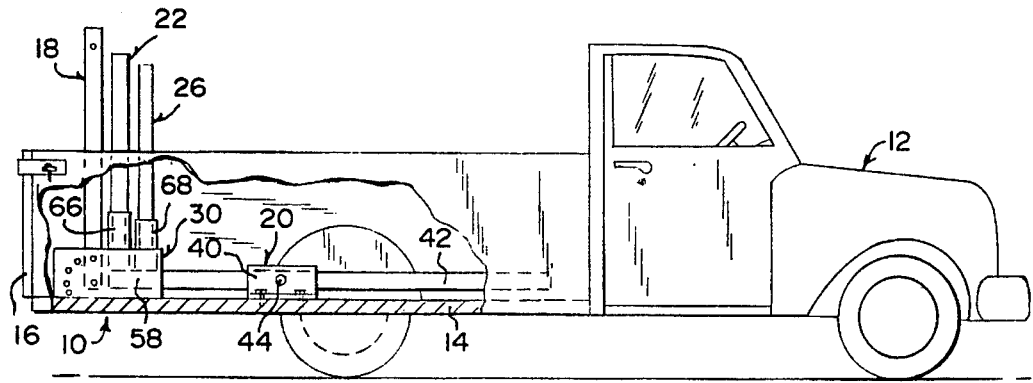
FIG. 1 is a diagrammatic side elevational view with parts broken away illustrating the instant invention installed on a truck.
Figure 2:
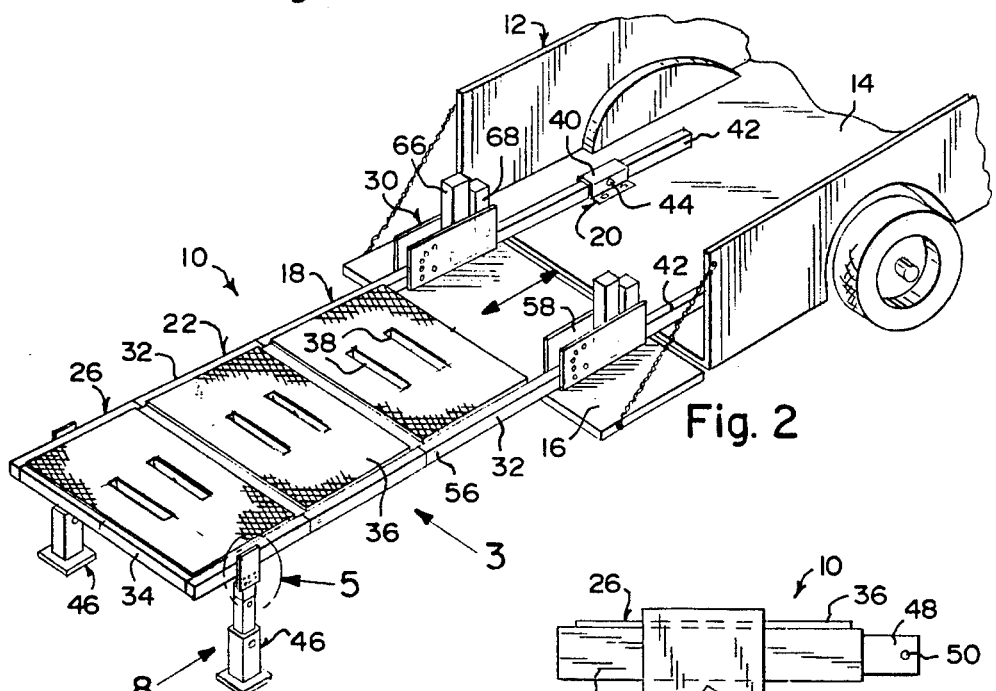
FIG. 2 is a diagrammatic rear perspective view with the truck broken away illustrating the instant invention extended for use as a table or work bench.
Figure 5:
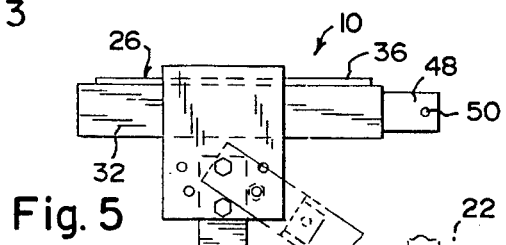
FIG. 5 is an enlarged diagrammatic side elevational view with parts broken away as indicated by arrow 5 in FIGS. 2 and 3.
Figure 3:
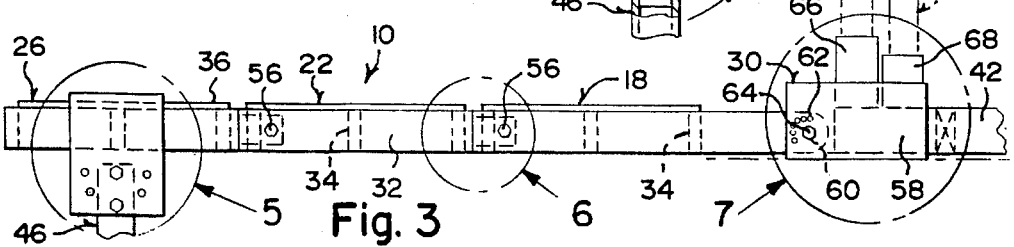
FIG. 3 is an enlarged diagrammatic side elevational view taken in the direction of arrow 3 in FIG. 2 with parts broken away illustrating some of the components in greater detail.

Turning now descriptively to the drawings, in which similar reference characters denote similar elements throughout the several views, FIGS. 1 through 8 illustrate a multiple purpose truck tailgate apparatus 10 for a pickup truck 12 of the type having a bed 14 and a tailgate 16 pivotally mounted to the bed 14. The apparatus 10 comprising a first panel member 18 is provided. A structure 20 is for mounting the first panel member in a sliding manner to the bed 14 of the truck 12. When the tailgate 16 is opened, the first panel member 18 can be extended therefrom. A second panel member 22 is provided. A facility 24 is for coupling the second panel member 22 against a free end of the first panel member 18. A third panel member 26 is provided. A facility 28 is for coupling the third panel member 26 against a free end of the second panel member 22. An assembly 30 is for pivoting the first panel member 18 on the sliding mounting structure 20. The first panel member 18 with the second panel member 22 and the third panel member 26 can be positioned at various angles at the opened tailgate 16, to be used for different tasks.

The first panel member 18, the second panel member 22 and the third panel member 26 each include a pair of side rails 32. Three crossbars 34 are spaced apart and connected between the side rails 32. A mesh plate 36 has two longitudinal spaced apart slots 38, mounted onto the side rails 32 and the crossbars 34.

The sliding mounting structure 20 consists of a pair of mounting brackets 40 attached to the bed 14 of the pickup truck 12. A pair of slider guide rails 42 are provided. Each slider guide rail 42 slide fits longitudinally through each mounting bracket 40. A pair of lock bolts 44 are provided. Each is threaded transversely into one mounting bracket 40, to retain the slider guide rail 42 in a stationary position.

A pair of adjustable stanchion units 46 are also provided, with each mounted transversely to one side rail 32 of the third panel member 26, so as to support the third panel member 26 when in a horizontal position. The first coupling facility 24 and the second coupling facility 28 contains a pair of plugs 48, each having a transverse hole 50 and extending from one end of one side rail 32. A pair of sockets 52 are provided, each having a transverse hole 54 and is formed in one end of one abutting side rail 32. The plugs 48 can be inserted into the sockets 52 with the transverse holes 50, 54 in alignment. A pair of connector pins 56 are to be inserted through the aligned transverse holes 54.

The pivoting assembly 30 includes a pair of pivot brackets 58. Each is affixed to an end of one slider guide rail 42 and has a pivot hole 60 and a plurality of angle position holes 62 radially about the pivot hole 60. A pair of pivot bolts 64 are provided. Each extends into one pivot hole 60 in one pivot bracket 58. A pair of position pins (not shown), are also provided. Each extends into one angle position hole 62 in one pivot bracket 58, to hold one side rail 32 of the first panel member 18 in a stationary angled position thereto.

Each pivot bracket 58 contains a first upstanding sleeve 66 affixed thereto, to receive one plug 48 on one side rail 32 of the second panel member 22 for storage when not in use. A second upstanding sleeve 68 is also affixed thereto, to receive one plug 48 on one side rail 32 of the third panel member 26 for storage when not in use.

OPERATION OF THE INVENTION

Figure 4:
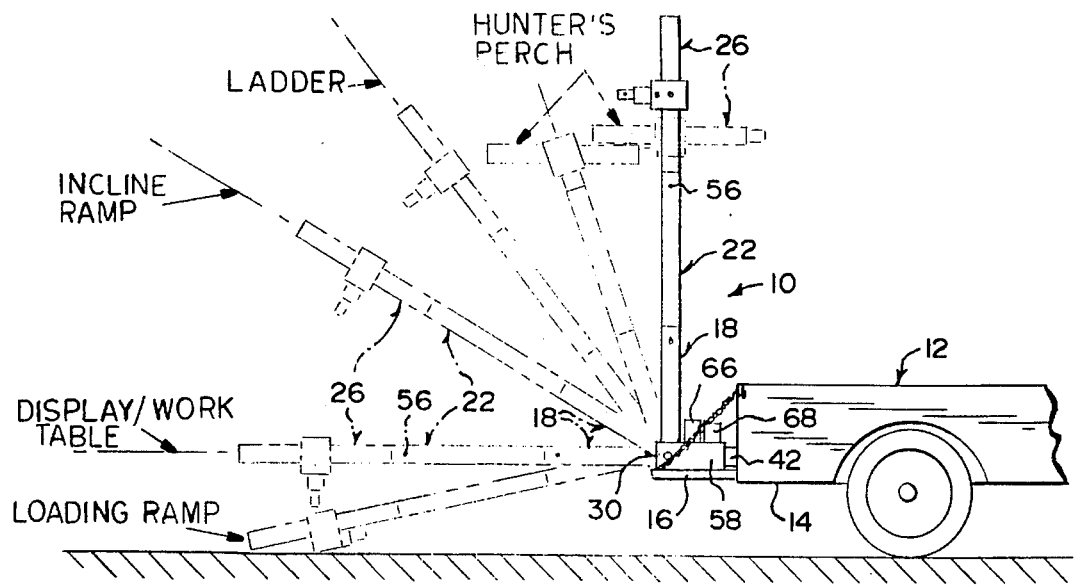
FIG. 4 is a diagrammatic side elevational view with the truck broken away illustrating various positions suitable for different uses of the instant invention.
Figure 6:
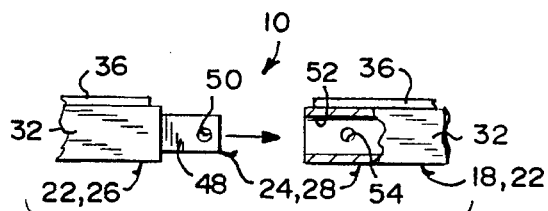
FIG. 6 is an enlarged diagrammatic exploded side elevational view with parts broken away as indicated by arrow 6 in FIG. 3.
Figure 7:
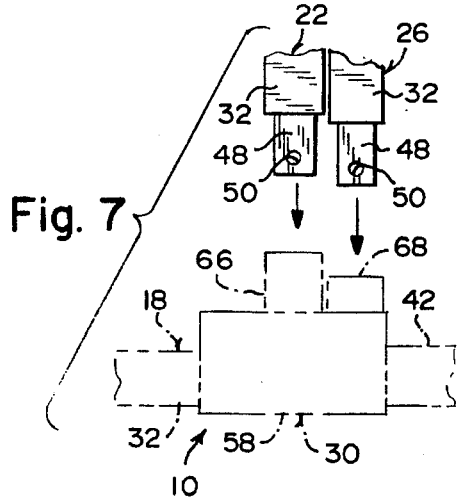
FIG. 7 is an enlarged diagrammatic exploded side elevational view with parts broken away and in phantom as indicated by arrow 7 in FIG. 3.
Figure 8:
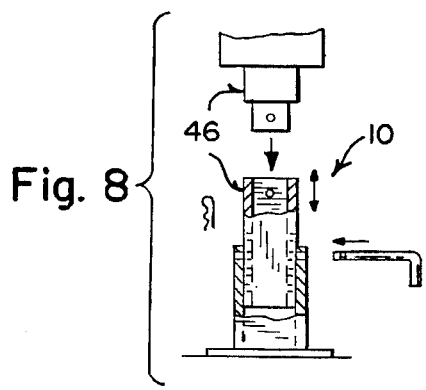
FIG. 8 is an enlarged diagrammatic exploded side elevational view with parts broken away taken in the direction of arrow 8 in FIG. 2.

To use the multiple purpose truck tailgate apparatus 10, a person simply opens the tailgate 16. The lock bolts 44 are loosened and the slider guide rails 42 are pulled longitudinally through the mounting brackets 40, until the pivot brackets 58 rest on the open tailgate 16. The lock bolts 44 are tightened. The first panel member 18, the second panel member 22 and the third panel member 26 are coupled together. The apparatus 10 can be positioned in any angle, as shown in FIG. 4, such as for a loading ramp, a display work table, an incline ramp, a ladder or a two position hunter's perch. The apparatus 10 is then locked in position on the pivot brackets 58, so that the various tasks can be accomplished.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A multiple purpose truck tailgate apparatus for a pickup truck of the type having a bed and a tailgate pivotally mounted to the bed, said apparatus comprising:

a) a first panel member including a pair of side rails, at least two crossbars spaced apart and connected between said side rails, and a mesh plate having two longitudinal spaced apart slots mounted onto said side rails and said crossbars;

b) sliding mounting means for mounting said first panel member in a sliding manner to the bed of the truck, so that when the tailgate is opened said first panel member can be extended therefrom, said sliding mounting means including a pair of mounting brackets attached to the bed of the pickup truck, a pair of slider guide rails, each said slider guide rail slide fits longitudinally through each said mounting bracket, and a pair of lock bolts each threaded transversely into one said mounting bracket to retain said slider guide rail in a stationary position;

c) a second panel member including a pair of side rails, at least two crossbars spaced apart and connected between said side rails, and a mesh plate having two longitudinal spaced apart slots mounted onto said side rails and said crossbars;

d) first coupling means for coupling said second panel member against a free end of said first panel member;

e) a third panel member including a pair of side rails, at least two crossbars spaced apart and connected between said side rails, and a mesh plate having two longitudinal spaced apart slots mounted onto said side rails and said crossbars;

f) second coupling means for coupling said third panel member against a free end of said second panel member; and g) means for pivoting said first panel member on said sliding mounting means, so that said first panel member with said second panel member and said third panel member attached thereto can be positioned at various angles at the opened tailgate, to be used for different tasks.

2. A multiple purpose truck tailgate apparatus as recited in claim 1, further including a pair of adjustable stanchion units, each mounted transversely to one said side rail of said third panel member, so as to support said third panel member when in a horizontal position.

3. A multiple purpose truck tailgate apparatus as recited in claim 2, wherein said first coupling means and said second coupling means each includes:

a) a pair of plugs, each having a transverse hole and extending from one end of one said side rail;

b) a pair of sockets, each having a transverse hole and formed in one end of one said abutting side rail, so that said plugs can be inserted into said sockets with said transverse holes in alignment; and c) a pair of connector pins to be inserted through said aligned transverse holes.

4. A multiple purpose truck tailgate apparatus as recited in claim 3, wherein said pivoting means includes:

a) a pair of pivot brackets, each affixed to an end of one said slider guide rail and having a pivot hole and a plurality of angle position holes radially about said pivot hole;

b) a pair of pivot bolts, each to extend into one said pivot hole in one said pivot bracket; and c) a pair of position pins, each to extend into one said angle position hole in one said pivot bracket, to hold one said side rail of said first panel member in a stationary angled position thereto.

5. A multiple purpose truck tailgate apparatus as recited in claim 4 wherein each said pivot bracket includes:

a) a first upstanding sleeve affixed thereto, to receive one said plug on one said side rail of said second panel member for storage when not in use; and b) a second upstanding sleeve affixed thereto, to receive one said plug on one said side rail of said third panel member for storage when not in use.

\* \* \* \* \*